US012765971B2

(12) United States Patent
Lai

(10) Patent No.: US 12,765,971 B2
(45) Date of Patent: Oct. 20, 2026

(54) SELF-LIGATING ORTHODONTIC BRACKET

(71) Applicant: Solventum Intellectual Properties Company, Maplewood, MN (US)

(72) Inventor: Ming-Lai Lai, Afton, MN (US)

(73) Assignee: Solventum Intellectual Properties Company, Eagan, MN (US)

( * ) Notice: Subject to any disclaimer, the term of this patent is extended or adjusted under 35 U.S.C. 154(b) by 646 days.

(21) Appl. No.: 17/922,610

(22) PCT Filed: Apr. 23, 2021

(86) PCT No.: PCT/IB2021/053380
§ 371 (c)(1),
(2) Date: Nov. 1, 2022

(87) PCT Pub. No.: WO2021/224712
PCT Pub. Date: Nov. 11, 2021

(65) Prior Publication Data

US 2023/0165663 A1 Jun. 1, 2023

Related U.S. Application Data

(60) Provisional application No. 63/019,548, filed on May 4, 2020.

(51) Int. Cl.
*A61C 7/28* (2006.01)

(52) U.S. Cl.
CPC .................................... *A61C 7/287* (2013.01)

(58) Field of Classification Search
CPC .. A61C 7/00; A61C 7/287; A61C 7/12; A61C 7/14; A61C 7/145; A61C 7/148; A61C 7/282; A61C 7/28; A61C 7/30
See application file for complete search history.

(56) References Cited

U.S. PATENT DOCUMENTS 4,536,154 A 8/1985 Garton, Jr. et al.
4,978,007 A 12/1990 Jacobs et al.
5,015,180 A 5/1991 Randklev
5,078,596 A 1/1992 Carberry et al.
5,254,002 A 10/1993 Reher et al.
5,366,372 A 11/1994 Hansen et al.
5,429,229 A 7/1995 Chester et al.
(Continued)

FOREIGN PATENT DOCUMENTS

KR 20150009765 A * 1/2015 ............... A61C 7/16
WO 2013055529 A1 4/2013
(Continued)

OTHER PUBLICATIONS

Cho, English Translation of KR 20150009765, 2015.*
(Continued)

*Primary Examiner* — Michael J Carey

(57) ABSTRACT

The present disclosure provides high strength, self-ligating appliances with orthodontically desirable dimensions. The appliances of the present disclosure incorporate a door slidably engaged to a channel in the body; one that can be opened or closed depending on the equilibrium position of an integral protrusion on the door. Cooperating grooves and rails on the body and the door can guide the door between the open and closed positions and mitigate against unintentional detachment.

20 Claims, 8 Drawing Sheets

(56) References Cited

U.S. PATENT DOCUMENTS

| | | | | |
|---|---|---|---|---|
| 6,183,249 | B1 | 2/2001 | Brennan et al. | |
| 6,648,638 | B2 | 11/2003 | Castro et al. | |
| 7,137,812 | B2 | 11/2006 | Cleary et al. | |
| 7,726,470 | B2 | 6/2010 | Cinader, Jr. et al. | |
| 8,469,704 | B2 | 6/2013 | Oda et al. | |
| 8,636,508 | B2 | 1/2014 | Förster | |
| 9,539,065 | B2 | 1/2017 | Cinader, Jr. et al. | |
| 2009/0298003 | A1 | 12/2009 | Wei et al. | |
| 2013/0224676 | A1 | 8/2013 | Alauddin et al. | |
| 2014/0134562 | A1* | 5/2014 | Wu | A61C 7/287 433/11 |
| 2014/0141383 | A1* | 5/2014 | Hagelganz | A61C 7/287 433/9 |
| 2017/0119501 | A1* | 5/2017 | Payne | A61C 7/287 |
| 2017/0143454 | A1 | 5/2017 | Yick et al. | |
| 2018/0193111 | A1 | 7/2018 | Oda | |
| 2019/0175306 | A1* | 6/2019 | Lai | A61C 7/14 |

FOREIGN PATENT DOCUMENTS

| | | | |
|---|---|---|---|
| WO | 2014018095 | A1 | 1/2014 |
| WO | 2018005072 | A1 | 1/2018 |
| WO | 2019130157 | A1 | 7/2019 |

OTHER PUBLICATIONS

Extended European Search Report for European Application No. EP217995091 dated Apr. 4, 2024, 8 pages.

International Search Report for PCT Application No. PCT/IB2021/053380, mailed on Jun. 8, 2021, 4 pages.

In-Ovation Roncone Single Self-Ligating Tube.022 Slot Lower Right 6-14° Torque 0° Angulation 4° Distal Rotation Hook, (date unknown but believed to be prior to the date of the filing of the present application), 2 pages.

* cited by examiner

SELF-LIGATING ORTHODONTIC BRACKET

BACKGROUND

Orthodontics is a field of dentistry associated with the professional supervision, guidance and correction of malpositioned teeth. The benefits of orthodontic treatment include attaining and maintaining a proper bite function, enhancing facial aesthetics, and improving dental hygiene. To achieve these goals, the orthodontic professional often makes use of corrective appliances that engage to the patient's teeth and apply gentle therapeutic forces to move the teeth toward proper positions.

One common type of treatment uses tiny slotted appliances called orthodontic brackets, which are adhesively attached to either the front or back surfaces of the teeth. To begin treatment, a resilient arch-shape wire ("archwire") is received into the slot of each bracket. The ends of the archwire are generally captured in tube-shaped molar appliances commonly called buccal tubes, which are affixed to the patient's molar teeth. Buccal tubes typically feature an enclosed passage extending in a mesial-distal direction. The enclosed passage helps prevent the end of the archwire from contacting the patient's soft tissue in the oral cavity, which might otherwise lead to pain and injury. In some instances, buccal tubes are provided with a convertible cap along one side of the passage that can be opened in order to convert the tube into a bracket when desired.

As the archwire slowly returns to its original shape, it acts as a track that guides the movement of teeth toward desired positions. When ligated to the brackets, the archwire acts as a track that guides teeth toward their proper locations during the course of treatment. In the beginning of treatment, the archwire tends to have small cross-sectional dimensions to facilitate ligation and also keep forces imparted to the teeth relatively low as the teeth unravel. In later stages of treatment, the teeth approach their target positions, allowing for progressively larger (and stiffer) wires to be used to improve the practitioner's control over the associated teeth. The brackets, tubes, and archwire are collectively known as "braces."

The procedure used to engage and activate the archwire on the orthodontic bracket is known as ligation. Traditional brackets are ligated to the archwire with the help of one or more pairs of opposing tiewings, or cleat-like projections on the bracket body. The archwire is placed in the archwire slot and generally a tiny elastomeric "O"-ring ligature, or alternatively metal ligature wire, is tightened over the archwire and under the undercut portions of tiewings located on opposite sides of the archwire slot. The ligature thus secures the archwire within the archwire slot of each bracket and provides a precise mechanical coupling between these bodies.

Ligatures have numerous drawbacks. For example, elastomeric ligatures have a tendency to lose their elasticity over time, resulting in inconsistent archwire sliding mechanics. While these ligatures can be made translucent for aesthetic treatment, they also tend to easily stain. Ligation using a ligature wire, on the other hand, can be quite cumbersome and time-consuming. Being made of metal, ligature wire is also generally considered non-aesthetic.

Self-ligating brackets present a solution to the above problems. These appliances generally use a clip, spring member, door, shutter, bail, or other ligation mechanism built into the bracket itself to retain the archwire in the slot, thereby obviating use of a separate ligature. Several advantages can derive from the use of self-ligating brackets. For example, these appliances can decrease friction between the archwire and the bracket compared with brackets ligated with elastomeric ligatures, potentially providing faster leveling and aligning of teeth in early stages of treatment. Depending on the ligation mechanism, these appliances can also simplify the installation and removal of an archwire, significantly reducing chair time for the treating professional. Finally, self-ligating brackets can also provide better hygiene than conventional brackets, which use elastomeric ligatures and ligature wires that can trap food and plaque.

SUMMARY & DEFINITIONS

The present disclosure provides high strength, self-ligating appliances with orthodontically desirable dimensions. The appliances of the present disclosure incorporate a door slidably engaged to a channel in the body; one that can be opened or closed depending on the equilibrium position of an integral protrusion. Cooperating grooves and rails on either or both the body and the door can guide the door between the open and closed positions, and mitigate against unintentional detachment. In an exemplary embodiment, these appliances also use a retention member located in the channel in concert with the door protrusion. The retention member, optionally in combination with one or more side walls of the channel, provides a plurality of regions for accommodating the protrusion. Based on the engagement between the protrusion and the retention member, these appliances can provide discrete, pre-defined opened and closed door positions, thereby facilitating archwire ligation for the treating professional. Moreover, the appliance of the present disclosure can include a relatively large hook for attachment of orthodontic auxiliaries, as the self-ligating mechanisms feature a channel spaced from the mesial-distal center of the appliance. The substantial offset between the channel and the mesial-distal center plane ensures that the hook does not interfere with the operation of the door.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a", "an", and "the" are not intended to refer to only a singular entity, but include the general class of which a specific example may be used for illustration. The terms "a", "an", and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise. The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

Directional Definitions

As used herein:

"Mesial" means in a direction toward the center of the patient's curved dental arch.

"Distal" means in a direction away from the center of the patient's curved dental arch.

"Occlusal" means in a direction toward the outer tips of the patient's teeth.

"Gingival" means in a direction toward the patient's gums or gingiva.

"Facial" means in a direction toward the patient's lips or cheeks.

"Lingual" means in a direction toward the patient's tongue.

Figure 1:
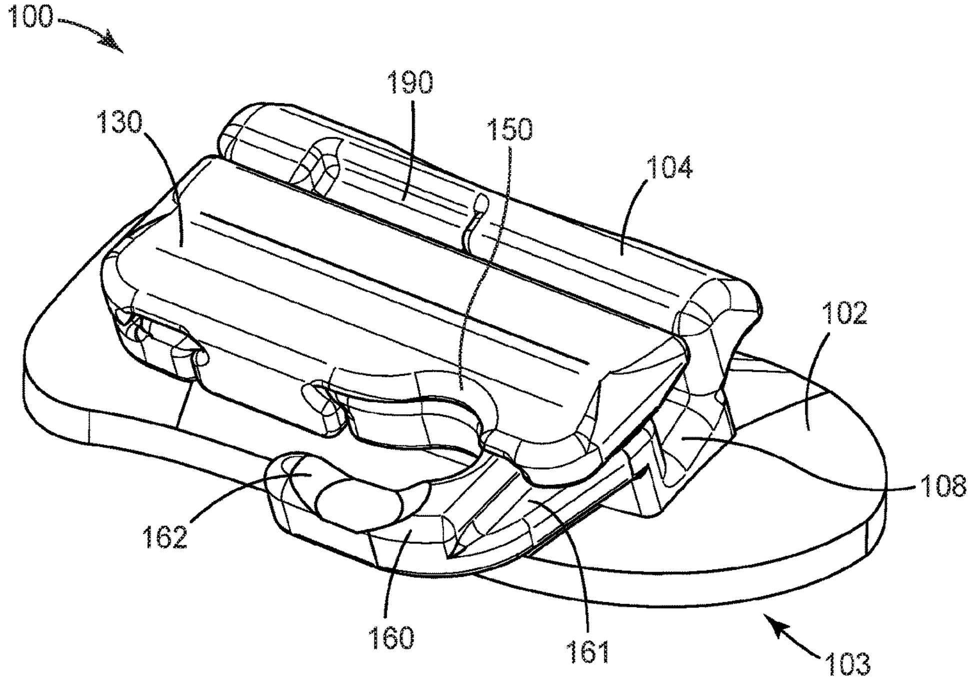
FIG. 1 is a perspective view of an orthodontic molar appliance according to one embodiment, looking toward its facial, gingival, and mesial sides.

While the above-identified figures set forth several embodiments of the disclosure other embodiments are also contemplated, as noted in the description. In all cases, this disclosure presents the invention by way of representation and not limitation. It should be understood that numerous other modifications and embodiments can be devised by those skilled in the art, which fall within the scope and spirit of the principles of the invention.

DETAILED DESCRIPTION

The sections below describe illustrative embodiments directed to self-ligating orthodontic appliances and methods related thereto. These embodiments are exemplary and accordingly should not be construed to unduly limit the invention. For example, it is to be understood that one of ordinary skill can adapt the disclosed appliances and methods for attachment to either the labial or lingual surfaces of teeth, to different teeth within the same dental arch (for example, corresponding appliances on mesial and distal halves of the dental arch), or to teeth located on either the upper or lower dental arches.

The appliances and methods described herein may optionally be customized to the individual patient undergoing treatment. Material and dimensional specifications could also vary from those disclosed herein without departing from the scope of the claimed invention. Unless otherwise specified, the provided appliances and components could be constructed of any of a variety of metal, ceramic, polymeric, and composite materials known to those skilled in the art. Further, unless otherwise indicated, dimensions associated with the appliances and their components are not critical and the accompanying drawings are not necessarily drawn to scale.

The orthodontic appliance 100 of this embodiment and the orthodontic appliances of other embodiments, unless otherwise indicated, are described herein using a reference frame attached to a labial surface of a molar tooth on the lower jaw. Consequently, terms such as labial, lingual, mesial, distal, occlusal, and gingival used to describe the orthodontic appliance 100 are relative to the chosen reference frame. The embodiments, however, are not limited to the chosen reference frame and descriptive terms, as the orthodontic appliance 100 may be used on other teeth and in other orientations within the oral cavity. For example, the orthodontic appliance 100 may also be coupled to the lingual surface of the tooth. Those of ordinary skill in the art will recognize that the descriptive terms used herein may not directly apply when there is a change in reference frame. Nevertheless, the embodiments are intended to be independent of location and orientation within the oral cavity and the relative terms used to describe embodiments of the orthodontic bracket are to merely provide a clear description of the embodiments in the drawings.

Figure 2:
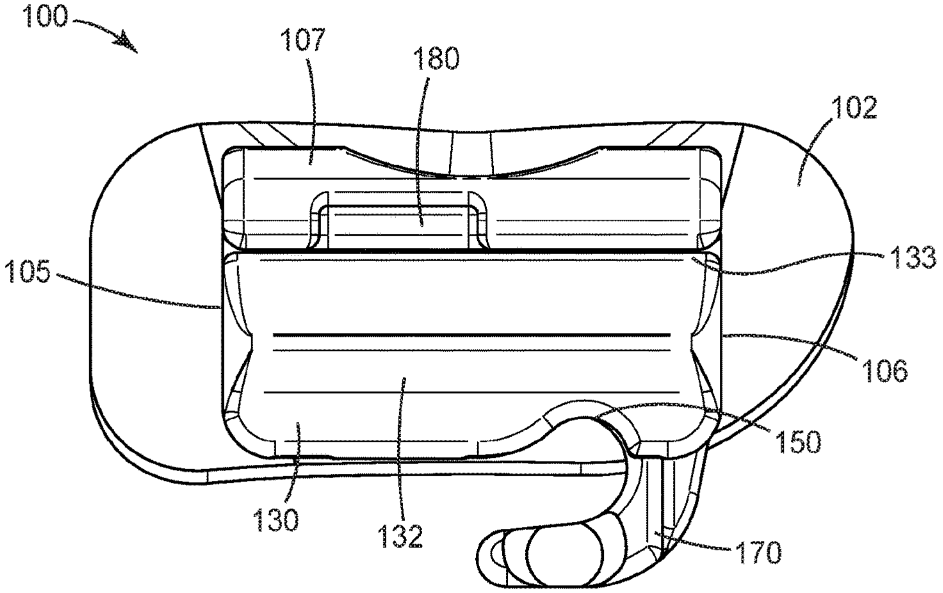
FIG. 2 is a plan view of the appliance of FIG. 1, looking toward its facial side.

An orthodontic appliance according to one embodiment, designated by the numeral 100, is shown in FIGS. 1 and 2 in assembled form. The appliance 100 has a base 102 and a body 104 extending outwardly from the base 102. The bottom of the base 102 has a bonding surface 103 having a concave three-dimensional surface contour generally approximating that of a respective tooth to which the appliance 100 is to be bonded. In certain embodiments, the bonding surface 103 may feature a compound contour, with curvature in both the mesial-distal and occlusal-gingival direction, as set out in US Publication No. 2018/0193111 (Oda et al.). The additional, compound curvature can provide for a reduced gap between the bonding surface 103 and the molar tooth enamel, as the compound, mesial-distal curvature more closely approximates the buccal surface contour of a molar tooth. However, in certain instances (such as in appliances intended for anterior teeth), the base may be curved along only one direction or alternatively have a flat or substantially flat configuration. In yet other alternatives, the base may be a custom base substantially matching the contour of a particular patient's tooth.

The bonding surface 103 can optionally include mesh, holes, bumps, recesses, undercuts, a microetched surface, glass grit, bonded particles, an organo-silane treated surface, or any other known mechanical or chemical modification to enhance adhesive bonding between the base 102 and the underlying tooth. Alternatively, the base 102 could also have a banded configuration in which the base 102 fully encircles the tooth. In other implementations, the base 102 may include a fixed, compressible material to assist in filling gaps between the base 102 and the tooth structure. Suitable compressible materials are described in, for example, U.S. Pat. No. 9,539,065 (Cinader).

Figure 3:
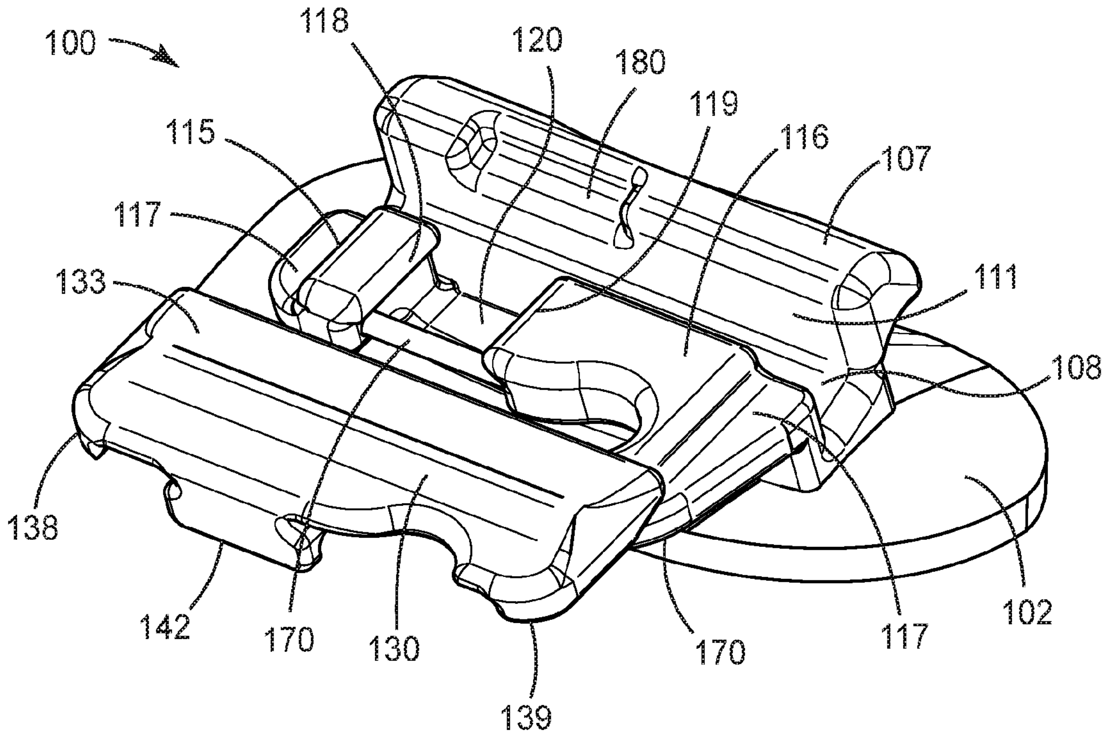
FIG. 3 is an exploded, perspective view of the appliance of FIGS. 1-2, looking toward its gingival, facial, and mesial sides.

An archwire slot 108, having a generally rectilinear configuration, extends in a generally mesial-distal direction across a generally facial or buccolabial surface of the body 104. Referring particularly to the mesial view in FIG. 4, the archwire slot 108 includes a bottom facial wall 110 along with occlusal and gingival side walls 111, 112. The gingival wall 112 is at least partially defined by surfaces of door support sections 115, 116 on the gingival side of body 104 (See e.g., FIGS. 3 and 8). An archwire (not shown) is received in the archwire slot 108 and typically has a generally rectangular cross-section that substantially corresponds with walls 110, 111, 112 of the archwire slot 108. A close correspondence between the dimensions of the archwire and the archwire slot 108 can provide for a precise coupling between the archwire and appliance 100, giving the treating practitioner a high degree of control over the movement of teeth. It should be appreciated, however, that other archwire geometries can be used that do not closely approximate the dimensions of the slot walls.

The appliance 100 may be pre-adjusted for torque and angulation. Tooth angulation can be defined according to the teachings of Dr. Lawrence F. Andrews as the mesiodistal cant of the facial axis of the clinical crown ("FACC") relative to a line perpendicular to the occlusal plane (see, e.g., Straight Wire, The Concept and Appliance, by Lawrence F. Andrews, (L. A. Wells Co., © 1989)). Bracket angulation may be defined as the particular angular orientation of the archwire slot of the bracket relative to the base of the bracket in order to provide tooth angulation. Tooth torque may be defined as the buccolabial-lingual cant of the FACC when measured from a line perpendicular to the occlusal plane. Consequently, bracket torque may be defined as the orientation of the archwire slot relative to the base of the bracket such that the desired tooth torque is attained. Bracket torque is typically provided via a specified angle of the archwire slot or passage, i.e., "torque in the slot", or an angle is formed in the tooth mounting surface of a bracket, i.e., "torque in the base". Under either configuration, the appliance 100 can be provided with a certain torque that is designated by the letter "T" in FIG. 4. The torque, or angle T, is equivalent to the angle between a reference plane 175 containing the bottom wall 110 of the archwire slot 108 and a reference line 177. The reference line 177 extends in an occlusal-gingival direction and tangent to the base 102 at a point that is located in a lingual direction beneath the mesial-distal center and occlusal-gingival center of the archwire slot 108. Reference line 177 accordingly lies within a torque plane of the appliance 100.

The appliance 100 includes a hook 160 for connection to another orthodontic device. The hook 160 in this embodiment has an overall curved configuration that extends from the gingival side of the body 104. The curved longitudinal axis of the hook 160 extends away from the body 104 first in a gingival direction, and then in a distal direction. At least the gingivally extending hook portion 161 resides in and is generally coplanar with the facial surfaces of the body 104 on the gingival side of the slot 108. The coplanar relationship of the hook 160 and body reduces the profile of the appliance 100 near the patient's adjacent gingival and cheek tissue, enhancing the relative comfort of the appliance 100 when installed. The gingivally extending hook portion 162 projects to an end 163 residing at or substantially near a plane including the mesial-distal center of the slot 108 and reference line 177. In other embodiments (not shown), the gingivally extending portion 162 may project towards the base 102, further reducing the buccal-lingual profile of the appliance 100. All of the surfaces of the hook 160 can be smoothly rounded to avoid irritating soft tissue in the oral cavity.

Figure 4:
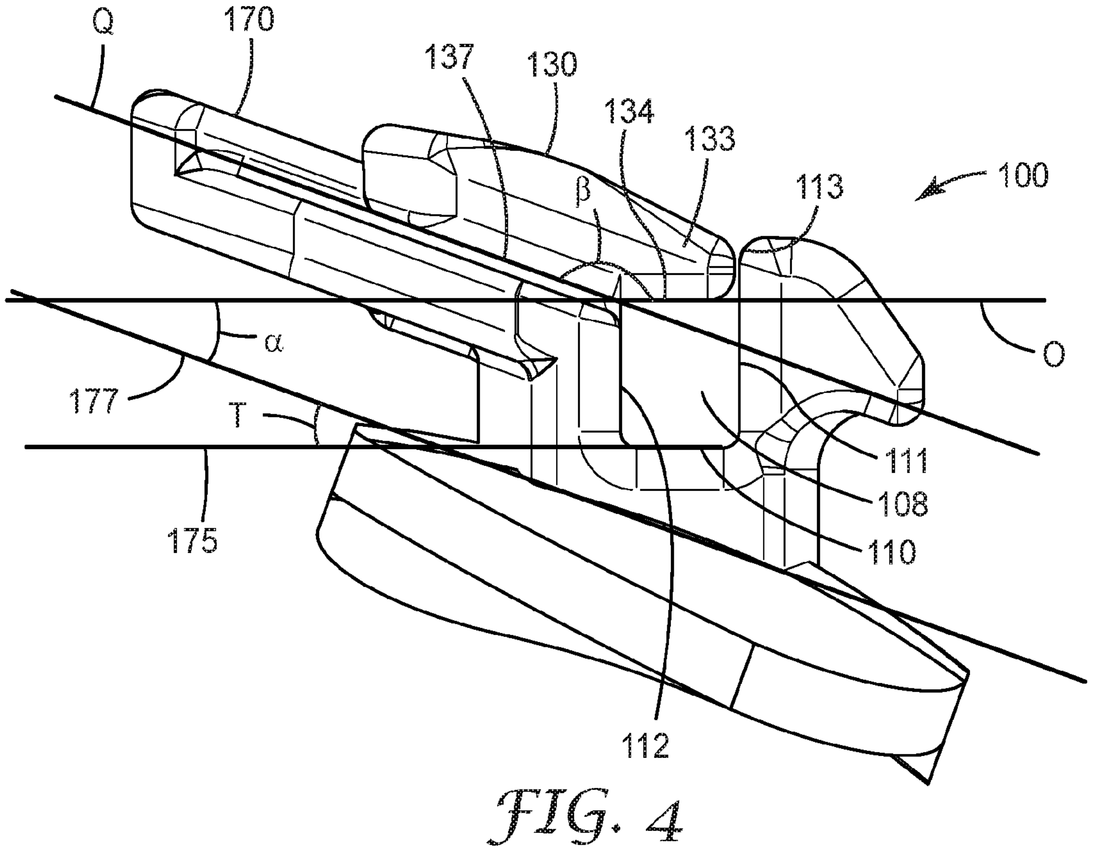
FIG. 4 is a side view of the appliance of FIGS. 1-3 with a door closed to restrict access to an archwire slot, looking toward its mesial side.

A door 130, slidably received in the body 104, controls access to the archwire slot 108 and is shown in its closed position in FIGS. 1-2 and 4. A portion of the door 130 extends across a central portion of the archwire slot 108 when closed, thereby preventing ingress or egress of an archwire (not shown here) with respect to the slot 108 of the appliance 100. In the configuration shown in FIG. 1, the archwire would be securely ligated to the appliance 100 such that the archwire will not become accidently dislodged as a result of normal chewing and brushing activity that occurs in a patient's mouth. The door 130 is capable of sliding within an occlusal-gingivally extending channel 120 to toggle between an open position allowing access to the archwire slot 108 (depicted in FIGS. 3 and 5) and the closed position. The archwire can, and typically should, be capable of sliding along the length of the archwire slot 108, thereby allowing the archwire to function as a track that guides the movement of maloccluded teeth. Such sliding is especially prominent as the teeth unravel during the leveling and aligning stages of treatment.

Figure 7:
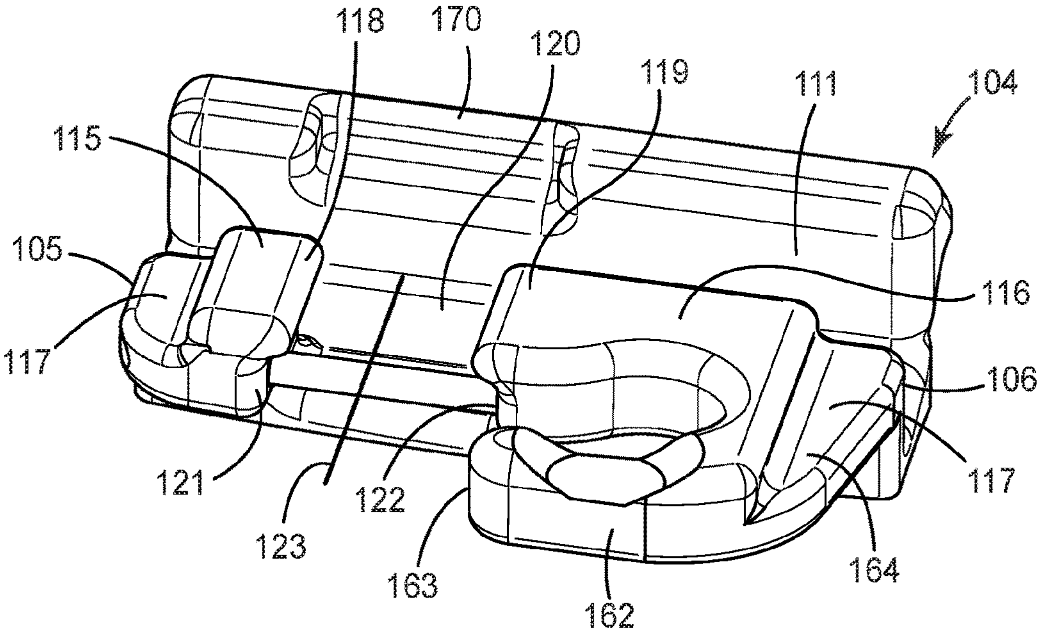
FIG. 7 is a perspective view of the appliance of FIGS. 1-5 with the door removed to expose hidden features of the appliance.
Figure 8:
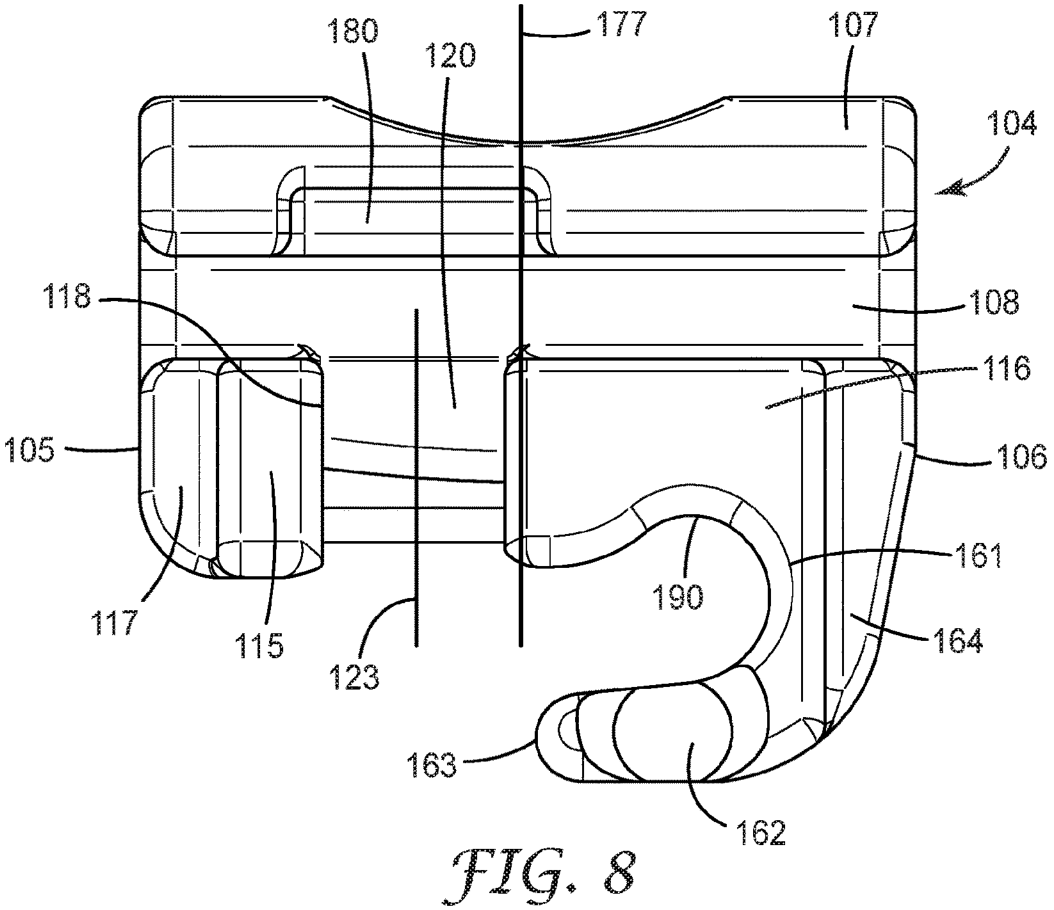
FIG. 8 is a plan view of the appliance of FIG. 7, looking towards its facial side.

Turning to FIGS. 7 and 8, in this and other embodiments described below, the channel 120 is formed in the body 104 on the gingival side of the archwire slot 108 and defines a path of travel for the door 130. The channel 120 essentially separates regions of the body 104, creating a pair of door support sections 115, 116. The distal door support section 115 extends between the distal edge 121 of the channel 120 to the distal edge 105 of the body 104, while the mesial door support section extends between the mesial edge 122 of the channel to a mesial edge 106 of the body 104. The distal and mesial door support sections 115, 116 include a planar guide surface 117 adjacent the distal or mesial edges 105, 106 of the body 104, respectively. The guide surfaces 117 feature a reduced facial-lingual height compared to other areas of the respective door support section 115, 116. The hook 160 includes a groove 164 defined by surfaces continuing from guide surface 117 and mesial door support section 116. The groove 164 allows the door 130 to travel along and over a portion of the hook 160 during transition between open and closed states.

The door support sections 115, 116 additionally feature guiderails 118, 119 that project into the channel 120. The channel 120, as depicted, may accordingly include a narrower mesial-distal width between the guiderails 118, 119. The door 130 includes complementary channels and grooves (see FIGS. 9 and 10) that slide along the guide rails and planar guide surfaces as force is applied to the door in a generally occlusal-gingival direction, as further described below. As one skilled in the art can appreciate, there may be appropriate tolerances between the body 104 and the door 130 to facilitate sliding and avoid binding. The mesial door support section 116 includes a concave recess 190 adjacent the gingival edge of the body; the recess 190 provides additional clearance between the hook 160 and body 104 during installation and/or removal of an orthodontic auxiliary.

The center line 123 and mesial edge 122 of the channel are both spaced distally from the plane orthogonal to reference line 177 (i.e., the mesial-distal center of the appliance 100). This offset results in a mesial door support section 116 that has a greater width, as measured between the mesial edge 106 of the body and mesial edge 122 of the channel 120, and volume than the distal door support section 115. In some embodiments, the mesial door support section has a mesial-distal width that is at least 1.5 times larger than the mesial-distal width of the distal door support section. In other embodiments, the mesial door support section width is at least 1.75, at least 2, at least 2.5, at least 3 times the width of the distal door support section. The substantial offset between the channel 120 and the mesial-distal center plane ensures that the hook 160 does not interfere with the operation of the door 130. In presently preferred embodiments, no portion of the channel is colinear with the distal edge 163 of the hook 160.

The guiderails 118, 119 and channel 120 are dimensioned to receive complementary features on the door 130. The open gingival end of both the channel 120 allows the appliance 100 to be assembled by sliding the door 130 in a generally occlusal direction into the body 104 and disassembled by sliding the door 130 in a generally gingival direction. The areas of the channel under each guiderail 118, 119 are open towards their respective occlusal ends, in that the channel 120 is at least partially open into the archwire slot 108.

Various mechanisms can be implemented within the channel 120 to toggle the door 130 between discrete positions—for example, between open and closed positions. Temporary latch mechanisms that provide local equilibrium positions for the door 130 can advantageously prevent the door 130 from spontaneously closing when a treating professional is placing an archwire in the slot 108 or conversely, spontaneously opening during the course of treatment. In the depicted embodiment, the latch is a deflectable beam 170 extending in a mesial-distal direction across a portion of the channel 120, generally perpendicular to the direction of sliding for the door 130. Further examples of mechanism for temporarily arresting the position of the door 130 may be found International Publication No. WO 2014/018095 (Lai et al.).

The deflectable beam 170 is spaced from the gingival entrance to the channel 120 and is received in a lateral channel (not shown) that extends through at least one of the distal and mesial door support sections 115, 116 of the body 104. In some embodiments, the lateral channel extends through both the distal and mesial door support section 115, 116 thereby splitting the channel into two channel sections (i.e., mesial and distal), but this does not have be the case. The beam 170 can extend through all or a portion of each channel section. In one particularly advantageous implementation, the beam extends through portions of the lateral channel in both distal and mesial door support sections 115, 116. One end of the beam 170 can be fixed in a mesial or distal section of the lateral channel using an adhesive, tag welding the open end or the like, leaving the other end free in the opposite channel section. This retention structure for the beam 170 prevents inadvertent disassembly during debonding by e.g., fracturing of a frangible web as described in issued U.S. Pat. No. 5,366,372 (Hansen, et al.), as only the fixed end of the beam 170 will typically remain in the lateral channel.

In the assembly of the door 130, the beam 170 functions as a latch by resiliently deflecting toward the bottom wall 126 of the channel 120 to permit passage of the door 130 as it is urged in an occlusal direction against the beam 170. The beam 170 accordingly acts to prevent inadvertent occlusal-gingival movement of the door, particularly between open and closed positions. Additional aspects of the interaction between the door 130 and the beam 170 are discussed in detail below.

The beam 170 as depicted includes a generally circular cross-section, however other cross-sectional configurations, such as rectangular or ovular, are possible. Additional, suitable beam geometries are, for example, described with respect to FIGS. 20-25 of International Publication No. WO 2014/018095. The beam 170 is preferably made from a resilient metal alloy, such as stainless steel, titanium, cobalt-chromium alloy (such as manufactured by Elgiloy Specialty Metals, Elgin, IL), or a shape-memory alloy such as an alloy of nickel and titanium (e.g., Nitinol). In presently preferred implementations, the beam 170 is sufficiently resilient so that the shape of the beam 170 when relaxed does not significantly change during the course of treatment.

Figure 9:
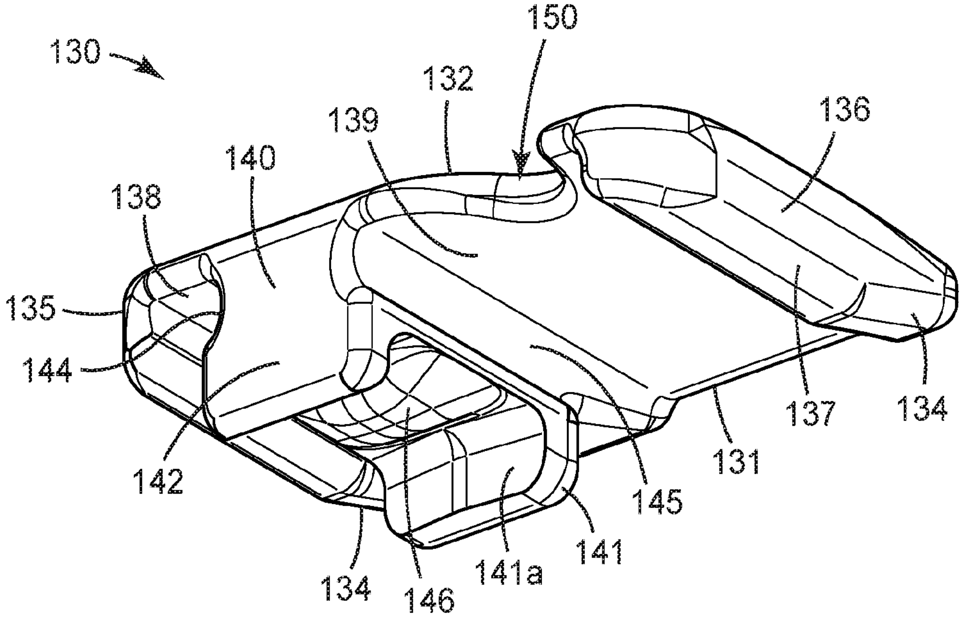
FIG. 9 a perspective view of the door the appliance of FIGS. 1-6, looking toward its gingival, lingual, and mesial sides.
Figure 10:
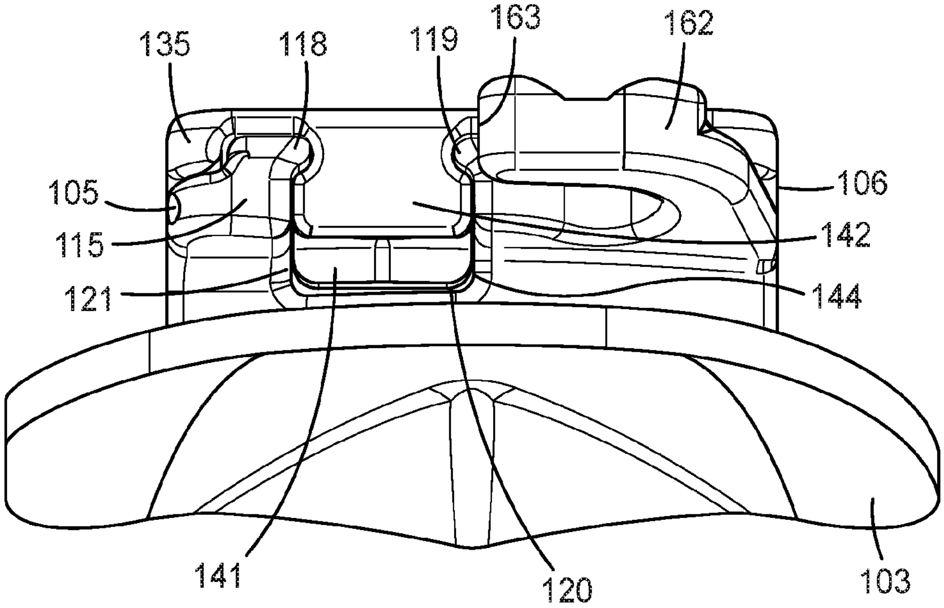
FIG. 10 is a plan view of the appliance of FIG. 1-7, looking towards its gingival side.
Figure 11:
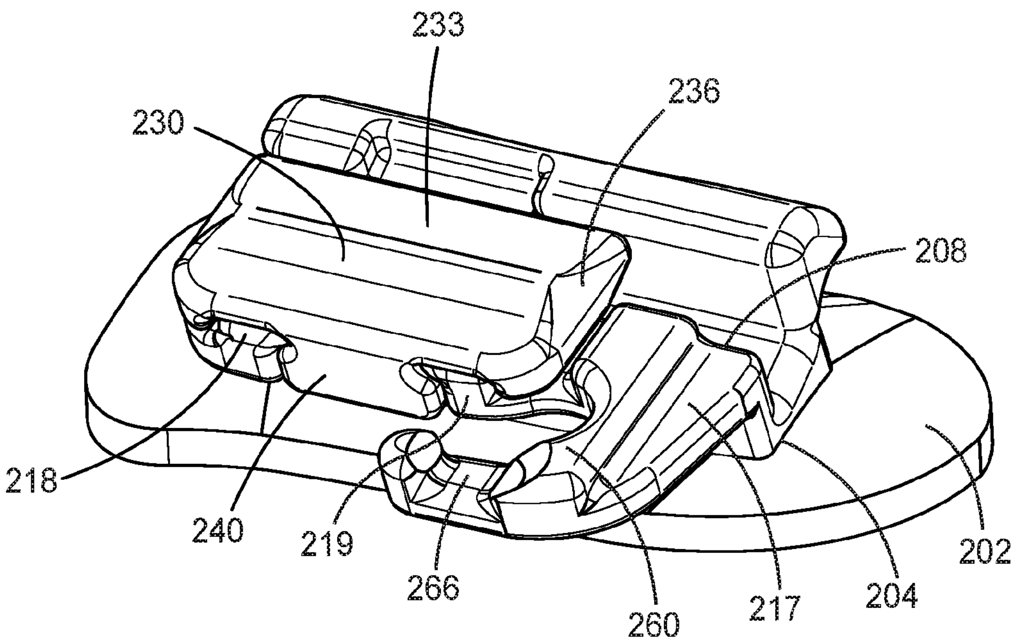
FIG. 11 is a perspective view of an orthodontic molar appliance according to another embodiment, looking toward its facial, gingival, and mesial sides.
Figure 12:
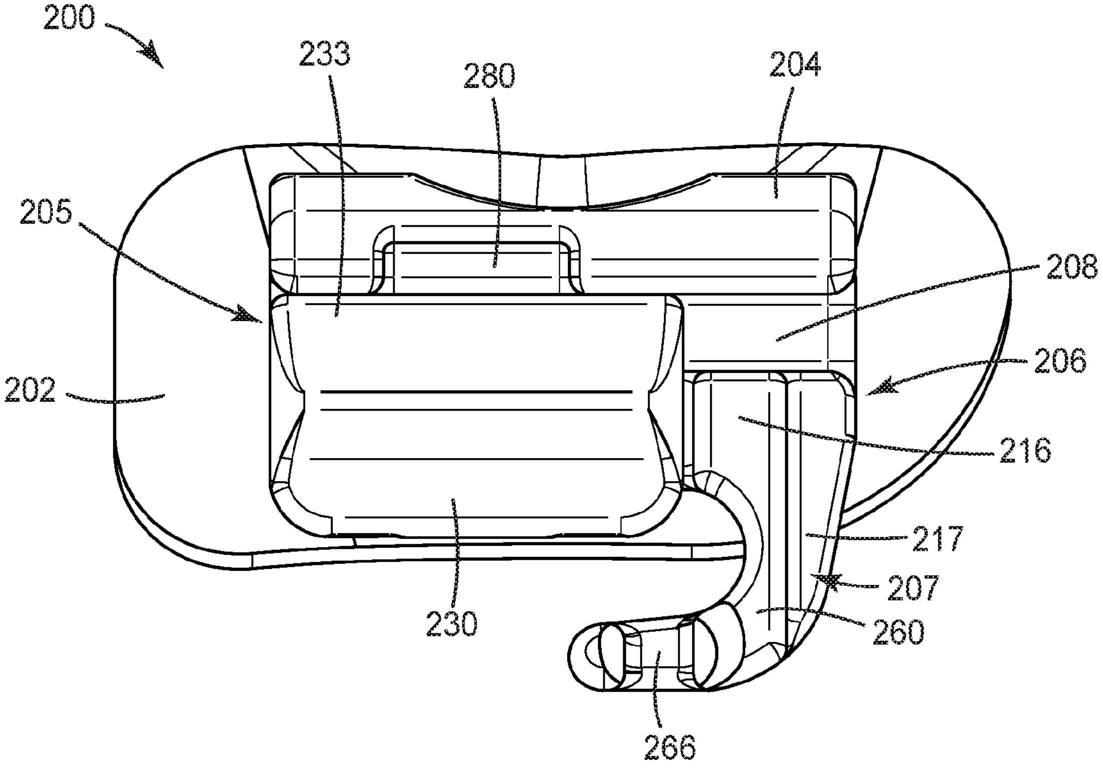
FIG. 12 is a plan view of the appliance of FIG. 11, looking toward its facial side.

As best depicted in FIG. 9, the door 130 includes a lingual surface 131 opposite a facial surface 132. The door 130 has mesial-distal width that substantially matches the overall mesial-distal width of the appliance 100. The door 130 includes a center strut 140 and wrap around fins 135 and 136 on each of the mesial and distal edges; two grooves 138, 139 extend between the strut 140 and the respective fin 135 or 136. The door 130 includes an occlusal edge region 133 that extends over the archwire slot 108 when the door 130 is in a closed position (See FIGS. 2 and 4). Accordingly, a portion of the contacting surface 134 beneath the edge region 133 will contact the archwire, if such contact is prescribed, when the archwire is received in the archwire slot 108. The door 130 can include a concave recess 150 that is dimensioned to align with the recess 190 on the mesial door support section when the door 130 is closed.

As can be appreciated by reference again to FIG. 2, the edge region 133 extends the essentially the full mesial-distal length of the archwire slot 108. A portion of the edge region 133 may abut wall surfaces 113 of the body adjacent the gingival wall 112 of the archwire slot 108 when the door is in the close position. The occlusal edge region 133 includes mesial and distal archwire contacting surfaces 134, disposed on the fins 135, 136 at mesial and distal ends of the archwire slot 108 when the door is in a closed position. Each contacting surface 134 defines a plane (labeled "O" in FIG. 4) that is at least substantially parallel to the bottom wall 110 of the archwire slot 108. As used in this context, a contacting surface is substantially parallel to the bottom wall if the deviation from parallel is no greater than 5 degrees. In presently preferred embodiments, the contacting surfaces 134 are parallel to the bottom wall 110, at least within typical manufacturing tolerances (i.e., the angle between the planes defining the relevant surfaces is no greater than 2 degrees). The contacting surfaces 134 are not, however, parallel to glide surfaces 137 that cover guide surfaces 117 on the door support sections 115, 116, as further described below. Furthermore, the plane O defining the contacting surfaces 134 can be oriented at an acute angle relative to the torque plane (e.g., reference line 177). In some embodiments, the angle α formed between the torque plane and the contacting surfaces plane O is at least about 10 degrees, at least about 20 degrees, or at least about 30 degrees.

The contacting surfaces 134 extend partially into the slot 108 height, and effectively control the facial-lingual slot height at the ends of the slot 108. In the depicted embodiment, the effective slot height is shorter at the mesial and distal ends by virtue of the contacting surfaces 134 than the slot height at regions adjacent the mesial-distal center of the slot 108. By reducing the height at the mesial and distal ends of the slot, the assembled appliance can better express one or both of a given appliance and archwire prescription, without sacrificing the strength of the bracket body 104. Because the door 130 can engage the archwire at two locations that are spaced apart from each other along a mesial-distal direction, it is possible to reduce angular slop in the archwire and achieve greater rotation control than otherwise achievable by engaging the archwire at a single location. Furthermore, the contacting surfaces 134 allow for the use of a relatively deep channel 120 without increasing the profile or facial-lingual height of the appliance 100. As can be appreciated by one skilled in the art, the mesial-distal width of edge region 133 of the door 130 may be extended to similarly span the length of an archwire slot.

The edge region 133 may, in certain embodiments, include at least one chamfer or other surface configuration gingival to the contacting surfaces 134 to act as a pushing element for guiding the archwire into the archwire slot 108. Additional attributes and configurations of pushing elements may be found in U.S. Pat. No. 8,469,704 (Oda et al.).

The distal and mesial edge fins 135, 136 include generally planar glide surfaces 137 that are spaced apart over the width of the door. The distance between the fins 135, 136 and the strut generally corresponds to width of the corresponding door support sections 115, 116, though tends to be slightly larger to allow for sliding operation of the door 130 in the channel 120. The glide surfaces 137 are generally offset from the guide surfaces 117 of the body 104 when the door 130 is received in the channel 120, such that the glide surfaces 137 move over, but do not contact, the body 104 when the door 130 is opened and closed. The glide surfaces 137 can, in certain implementations of the present disclosure, reside in a reference plane that is at least substantially parallel to the torque plane of the appliance. Providing glide surfaces that are parallel or substantially parallel to the torque plane helps to prevent or reduce undue rotation or tipping of the appliance 100; ensuring the bracket is seated in the prescribed or otherwise desired location; and further reducing the facial-lingual height of the appliance for enhanced patient comfort.

In the depicted embodiment, the glide surface 137 reference plane Q is oriented at an obtuse angle β relative to the bottom wall 110 of the archwire slot 108 and the plane O containing archwire contacting surfaces 134. The angle β between the glide surface reference plane Q and the plane O may vary or be acute depending on the torque angle of the appliance 100.

The door 130 further includes a strut 140 and a pair of grooves 138, 139 extending in an occlusal gingival direction on at least a portion of the lingual surface 131. As best depicted in FIGS. 9, the pair of grooves 138, 139 is formed into the lingual surface 131 of the door, with each groove disposed between a glide surface 137 and the strut 140. The grooves 138, 139 correspond in dimension and relative location to the door support sections 115, 116 on the body 104. The mesial groove 139, in order to accommodate the larger mesial door support section 116 of the body 104, has a greater width than the distal groove 138. As described above, the grooves 138, 139 slide along the pair of door support sections 115, 116, and are accordingly open-ended to assist in ease of assembly. Together, the door support sections 115, 116 and grooves 138, 139 guide the operative sliding motion of the door 130. The grooves 138, 139 can extend the full occlusal-gingival length of the door 130 as depicted or may terminate adjacent the occlusal edge region 133. As described above, the effective slot height 109 will be greater in regions of the archwire slot 108 covered by either groove 138, 139 when the door 130 is in the closed position.

The use of grooves 138, 139 in the lingual surface 131 allows for a reduced facial-lingual profile of the door 140, and accordingly appliance 100. By incorporating archwire contacting surfaces 134 that are spaced in a lingual direction from the grooves, the desired archwire slot height 109 can be maintained without sacrificing structural integrity of either the door 140 or the body 104. The structural integrity increases the amount of labial pull forces the door can withstand before a high stress and failure occurs. A higher labial pull force is particularly desirable for self-ligating brackets, which often encounter high forces during bonding, treatment, archwire exchange, and orthodontic treatment.

A strut 140 extends outwardly from the lingual surface 131 of the door 130. As assembled, the strut 140 is received in the channel 120 between door support sections 115, 116 of the appliance body (See for example FIG. 4). The strut 140 includes an occlusal leading edge projection 141 and a gingival trailing edge projection 142, each extending towards the bottom of channel 120. Though a single strut with multiple edge protections is depicted, alternative appliance configurations may include discrete struts extending into different portions of the channel 120 as assembled. The strut 140 extends in a lingual direction from a mesial-distal center region of the door 130 along an axis that is generally perpendicular to the glide surface 137 reference plane Q, giving the door 130 a generally "T-shaped" appearance when viewed in the distal direction as in FIGS. 4 and 5 and an "E-shaped" appearance when viewed in the occlusal direction as in FIG. 10. Depending on the desired torque angle of the appliance 100 however, the strut 140 may protrude along an axis extending at an oblique angle relative to the glide surface 137 reference plane Q.

A pair of generally concave strut channels 144, 145 extend the occlusal-gingival length of the strut 140 above (i.e., in a facial direction) from the edge projections 141, 142. The strut channels include a distal strut channel 144 and a mesial strut channel 145, disposed on opposite sides of the strut 140 and dimensioned to receive the body guiderails 118, 119, respectively. Each of the strut channels 144,145 is open on both its occlusal and gingival end, allowing for the rails 118, 119 to be easily inserted into the relevant channel 144, 145. The strut channels 144, 145 and corresponding rails 118, 119 cooperate to position the strut 140 in the channel 120, as well as dictate a consistent path of travel during assembly and ligation.

Figure 6A:
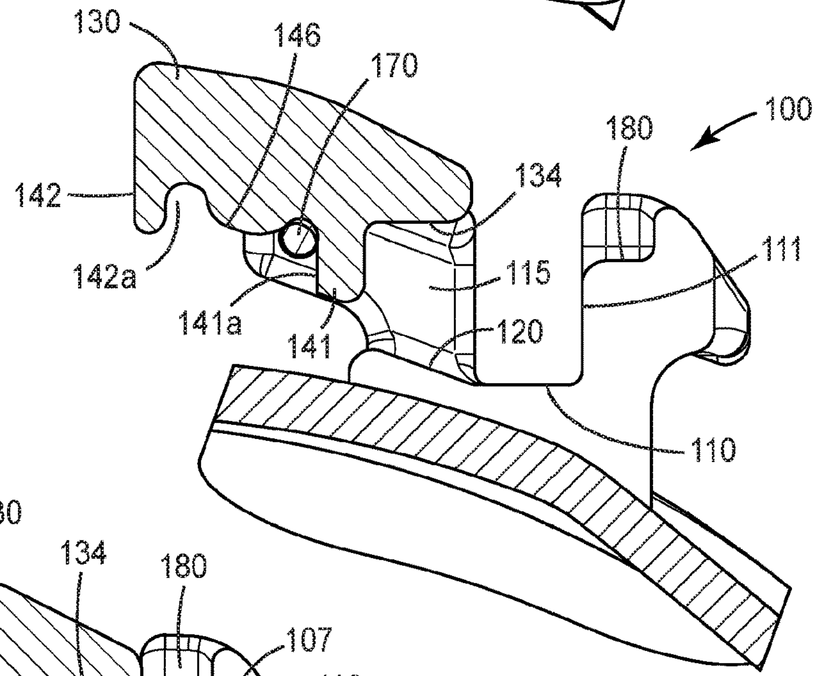
FIG. 6A is a cross-sectional view of the appliance of FIG. 5.
Figure 6B:
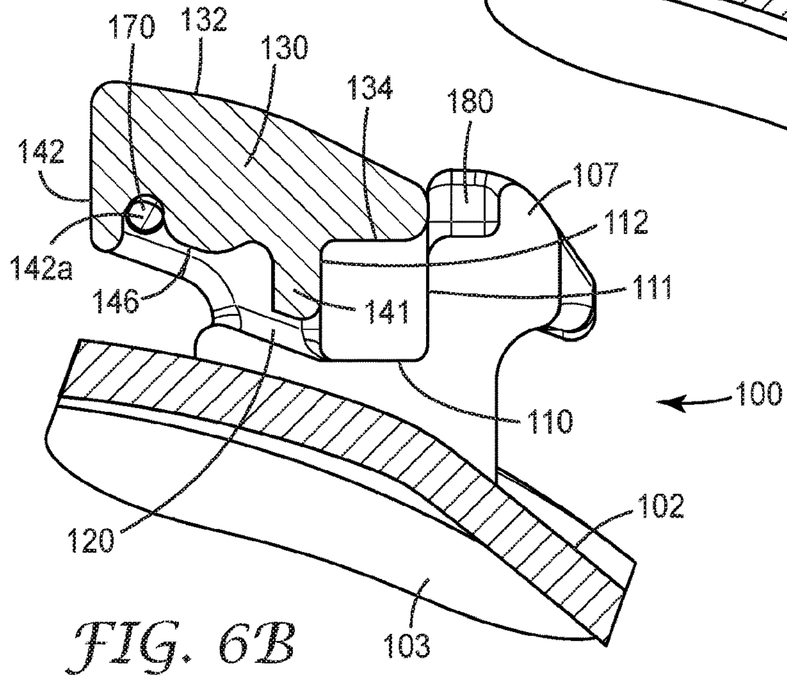
FIG. 6B is a cross-sectional view of the appliance of FIG. 4.

As further shown in FIGS. 6A, 6B and 9, the area between edge projections 141, 142 includes a dome-shaped protrusion 146. The protrusion 146 and interior wall sections 141*a*, 142*a* of the edge projections 141, 142 cooperate to hold the beam 170 captive and prevent food or other debris from entering the channel. Unless the door 130 is being actively opened or closed, the beam 170 generally remains in one position, corresponding to the open and closed positions of the door 130, as shown in FIGS. 6A and 6B. During active opening or closing of the door 130 the beam 170 is temporarily deflected from its resting position. Unless the door 130 is being actively opened or closed, protrusion 146 generally assumes one of two positions, corresponding to the open and closed positions, as shown in FIGS. 6A and 6B. Thus, door 130 can be reversibly opened and closed, as shown in FIGS. 6A and 6B, by sliding the protrusion 146 back and forth between regions on the occlusal and gingival sides of the deflectable beam 170.

Upon initial assembly and when sufficient force is applied to the door 130 in a generally occlusal direction, the protrusion 146 presses against the beam 170, causing it to deflect downwards (i.e. in a lingual direction) and permit the strut 140 to proceed further into the channel 120. Once the edge projection 141 continues to travel in the channel 120 and the beam 170 recovers, the beam 170 is disposed in an area between the protrusion 146 and gingival trailing edge projection 142 (See FIG. 6B). Here, the beam 170 is constrained in an equilibrium position between the trailing edge projection 142 and the protrusion 146. The appliance 100 is now in assembled form, with the door 130 in its closed position.

The interior wall 141*a* of the leading edge projection 141 acts as a positive stop surface, preventing gingival movement and disassembly of the door 130 after the door is open. The interior wall surface 141*a* of leading edge projection 141*a* can include convex curvature relative to the beam 170, including compound convex curvature in certain embodiments. In implementations with compound curvature, the convex interior wall surface 141*a* may present a continuously curved surface or may include a flat land area adjacent a mesial-distal center. In such implementations, the mesial and distal edges of the interior wall surface 141*a* will typically include a greater radius of curvature relative to other areas of the interior wall surface 141*a*. When the door 130 is open, the interior wall surface 141*a* will be disposed directly adjacent the occlusal surface of the beam 170. The presence of curvature can serve to dissipate forces from the beam 170 on edge projection 141 in the event the door is pulled in a gingival direction. Transfer of force across a curved interior wall surface 141*a* can prevent the leading edge projection 141 from fracturing and substantially disrupting operation of the door and consequently the patient's treatment.

Figure 5:
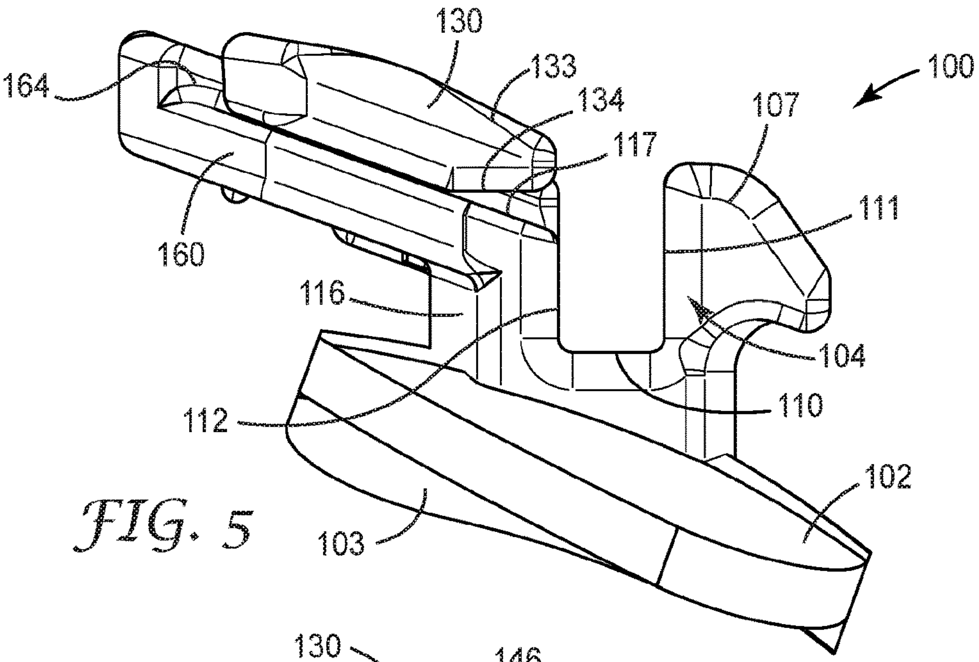
FIG. 5 is a side view of the appliance of FIGS. 1-4 with a door open to allow access to an archwire slot, looking toward its mesial side.

From the open configuration in FIGS. 5 and 6A, additional force can be applied to the door 130 in an occlusal direction to "close" the door 130 and limit facial access to the archwire slot 108. Upon reaching a threshold amount of force, the beam 170 can resiliently deflect to allow passage of the protrusion 146 into a second position. In this position, beam 170 can deflect back toward its original orientation in the channel 120 and is disposed between the interior wall 142*a* of the trailing projection 142 and the protrusion 146. (See FIG. 6B). Here, the beam 170 can be constrained in a second equilibrium position between the protrusion 146 and the trailing edge projection 142.

In some embodiments, the geometry of the protrusion 146 can also be tailored to adjust the forces required to open and close the door 130. For example, the opening and closing forces can be generally decreased by using a protrusion 146 having a generally trapezoidal profile (as viewed from the mesial or distal direction) and having a suitable side wall angle. In some embodiments, the side wall angle is less than about 45 degrees, less than about 35 degrees, or less than about 30 degrees. Conversely, the opening and closing forces can be increased by using a side wall angle greater than about 45 degrees, greater than about 55 degrees, or greater than about 60 degrees. If desired, asymmetric opening and closing forces can be realized by using a trapezoidal protrusion 146 with substantially different side wall angles. For example, the leading (or occlusal-facing) edge of the protrusion 146 could have a side wall angle of 40 degrees, while the trailing (or gingival-facing) edge of the protrusion 146 could have a side wall angle of 60 degrees, relative to the base of the protrusion. Such a configuration can allow threshold opening forces to be intentionally increased, preventing the door 130 from accidently opening during mastication. Additionally, in some embodiments, the geometry of the protrusion 146 can have an overall similar curved shape as shown in the figures, or a trapezoidal shape as described above, however protrusion 146 may have a geometry comprising multiple surface portions such as a stairstep cross-sectional profile, or a series of curved steps, or an array of individual fins separated by channels with a cross-sectional profile similar to teeth of a comb.

Once again, the process of opening and closing the door 130 can be made reversible because of the resilient nature of the beam 170. As the treating professional imparts occlusal and gingival forces to open and close the door 130, the beam 170 is deflectable towards the bottom wall of the channel 120, thereby allowing the protrusion 146 to toggle between residing on the gingival and occlusal sides of the beam 170, respectively. The occlusal region 107 of the body 104 may include an elongated notch 180 for receipt of a tool or hand instrument used to aid in opening of the door 130. Suitable tools include those featured in International Publication No. WO2019/0130157 (Wylie et al.), those the shape of the notch and the useful tools are not particularly limited.

The forces of opening and closing the doors are determined by, inter alia, the material properties, protrusion dimensions and the cross-sectional dimensions of the beam 170. In presently preferred implementations, the beam 170 is a wire segment of a superelastic nickel-titanium alloy. In one exemplary embodiment, the beam 170 has a circular cross-sectional configuration with a diameter of 0.18 millimeters (0.007 inches). Other embodiments can feature a beam with a diameter of at least 0.13 millimeters (0.005 inches) and no greater than 0.38 millimeters (0.015 inches). The protrusion 146 can have a height of 0.20 millimeters (0.008 inches) and an area of 0.356 millimeters×0.25 millimeters (0.014 inches×0.010 inches). The interference (e.g., overlap) between top of beam 170 and bottom of protrusion 146 is typically at least 0.127 millimeters (0.005 inches) and typically no greater than 0.381 millimeters (0.015 inches) when the appliance 100 is assembled and not in transition, with the interference providing further assurance against accidental or otherwise undesired opening of the door 130. The clearance between other surfaces on the door 130 and the body 104 is on average about 19 micrometers (0.00075 inches) when both bodies are assembled.

When the door 130 is in its closed position, the archwire slot 108 is enclosed by four substantially rigid walls. Optionally, the slot 108 has a gingival wall that is collectively defined by both a partial gingival wall 112 located on the body 104 and a partial bottom wall surface corresponding to occlusal leading edge projection 141 on the strut 140. The partial gingival walls 112 extend along mesial and distal portions of the slot 108 and straddle the partial wall surface defined by the leading edge projection 141, which extends along a central portion of the slot 108 when the door is in the closed position. In this particular embodiment, the slot 108 has a facial wall defined exclusively by the contacting surfaces 134 of the door 130 and an occlusal wall 111 exclusively defined by the body 104.

One benefit of the configuration described above is the lengthened interface between the rails and respective grooves. By increasing the occlusal-gingival length along which these mating surfaces engage each other, this configuration enhances stability, and reduces wobbling, of the door 130 as it slides open and closed along the body 104. This is especially useful where the appliance 100 is made as small as possible for patient comfort and space on the body 104 is limited.

Under most circumstances, the door 130 is adequate on its own to retain an archwire in the slot 108. If desired, however, a treating professional can elect to manually ligate the archwire with the assistance of the undercuts and tiewings located on the body 104. Ligation can be achieved, for example, by securing an elastomeric o-ring or ligature wire beneath the undercuts, over an archwire received in the slot 108, and beneath the tiewings. The undercuts and tiewings may also be used to secure a power chain to two or more teeth if so desired.

In exemplary embodiments, some or all of the base 102, body 104, and door 130 are made from stainless steel materials. Ceramic material can also be used. Particularly preferred ceramic materials include the fine-grain polycrystalline alumina materials described in issued U.S. Pat. No. 6,648,638 (Castro, et al.). These ceramic materials are known for their high strength and also provide superior aesthetics compared with metallic materials because they transmit light and can visually blend in with the color of the underlying tooth surface. In other embodiments, the base 102 and body 104 may be integrally made, for example, via machine or mold from a polymeric material as disclosed in U.S. Pat. No. 4,536,154 (Garton, et al.), or a polymer-ceramic composite such as glass-fiber reinforced polymeric composites as disclosed in U.S. Pat. No. 5,078,596 (Carberry, et al.) and U.S. Pat. No. 5,254,002 (Reher, et al.). Other suitable materials include, for example, metallic materials (such as stainless steel, titanium, and cobalt-chromium alloys) and plastic materials (such as fiber-reinforced polycarbonate), and combinations thereof. As an example, an appliance can include a base 102 and body 104 made from ceramic material, and the door 130 made from a polymeric composite; other material iterations and combinations are other possible.

FIGS. 11-15 illustrate an appliance 200 according to another embodiment of the present disclosure. The appliance 200 has many of the same features as the appliance 100, including a base 202, body 204 with an archwire slot 208, a door 230 slidably received in a channel 220, and a hook 260. Unlike appliance 100, the leading edge 233 of the door 230 does not extend the entire length of the archwire slot 208, and the width of the door 230 is not commensurate with the mesial-distal length of the body 204.

The body 204 includes an occlusal-gingivally extending primary channel 220 that divides the body 204 into distal and mesial door support sections 215, 216. The distal and mesial door support sections 215, 216 include a planar guide surface 217 adjacent the distal or mesial edges 205, 206 of the body 204, respectively. The hook 260 includes a groove 264 defined by surfaces extending from guide surface 217 and mesial door support section 216. The door support sections 215, 216 additionally feature guiderails 218, 219 that project into the channel 220.

The mesial door support section 216 further includes a secondary channel 250. The secondary channel 250 extends between the archwire slot 208 and the gingival edge of the body 204 and is dimensioned to receive the mesial edge fin 236 on the door 230. The secondary channel 250 is coaxial with a similarly dimensioned hook channel 266. The hook channel 266 is configured and dimensioned to receive a portion of the mesial fin 236 when the door 230 is in the open position. The distal and mesial edge fins 235, 236 include generally planar glide surfaces 237 that are spaced apart over the width of the door. The distance between the fins 235, 236 generally corresponds to the linear distance between the distal edge 251 of the secondary channel 250 and the edge 217*a* of the distal guide surface 217, though tends to be slightly larger to allow for sliding operation of the door 230 in the channels 220, 250. The glide surfaces 237 are generally offset from the guide surface 217 on the mesial door support section 216 and the bottom of channel 250 when the door 230 is assembled in the appliance, such that the glide surfaces 237 move over, but do not contact, the body 204 when the door 230 is opened and closed.

Figure 13:
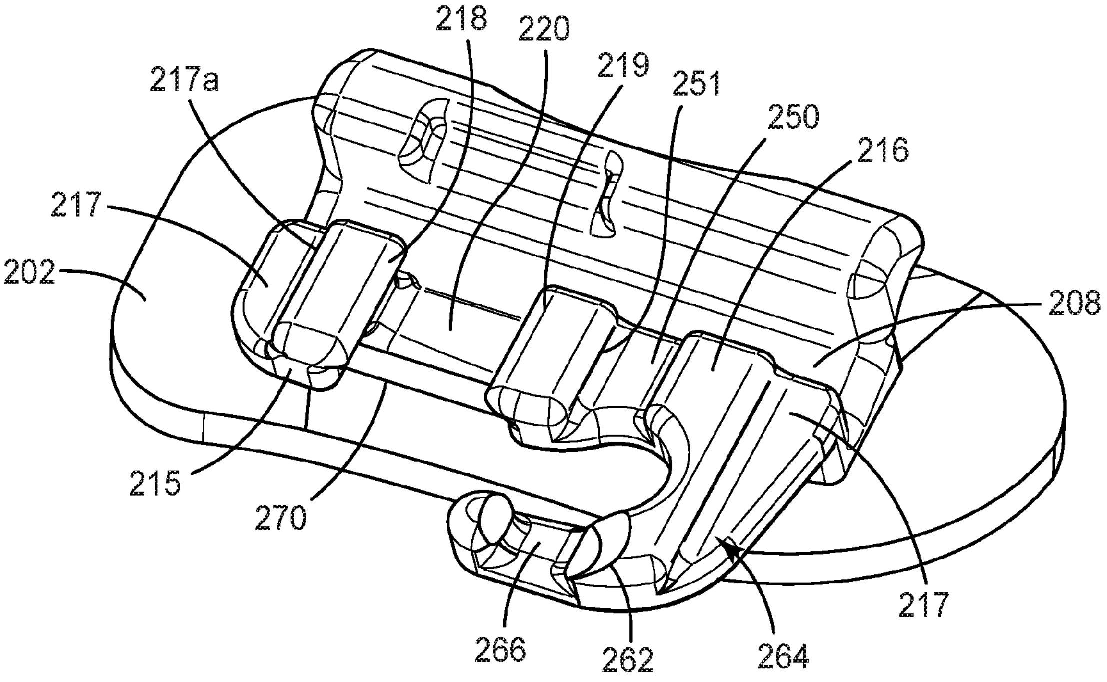
FIG. 13 is a perspective view of the appliance of FIGS. 11 and 12 with the door removed to expose hidden features of the appliance.
Figure 14:
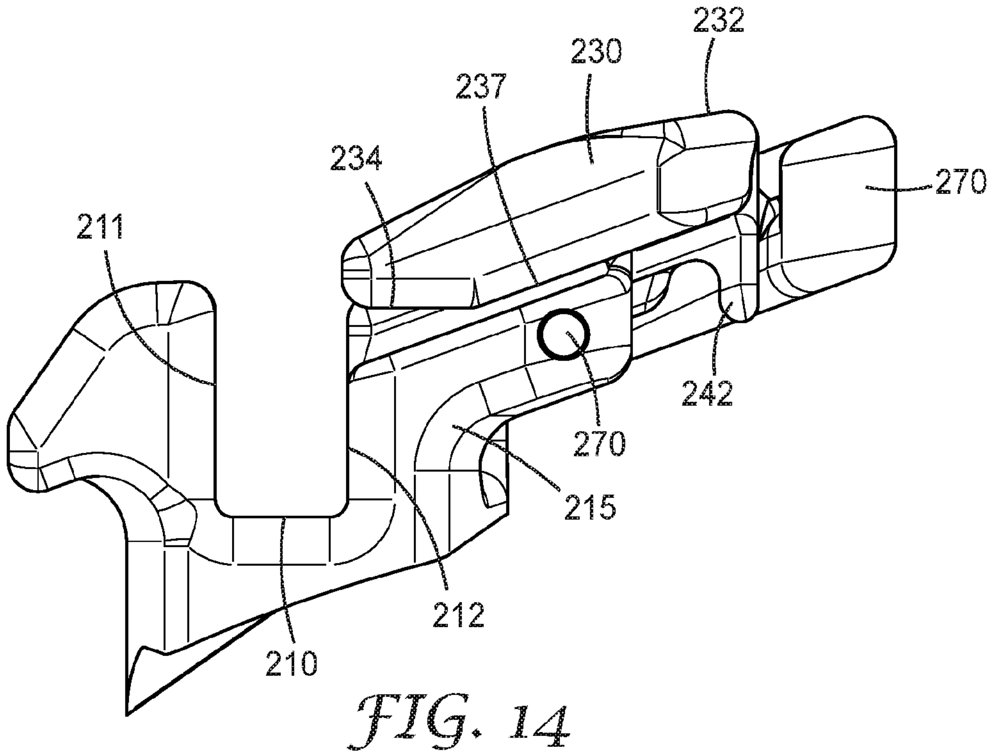
FIG. 14 is a side view of the appliance of FIGS. 11-13, looking toward its distal side, with the door in the slot open position.
Figure 15:
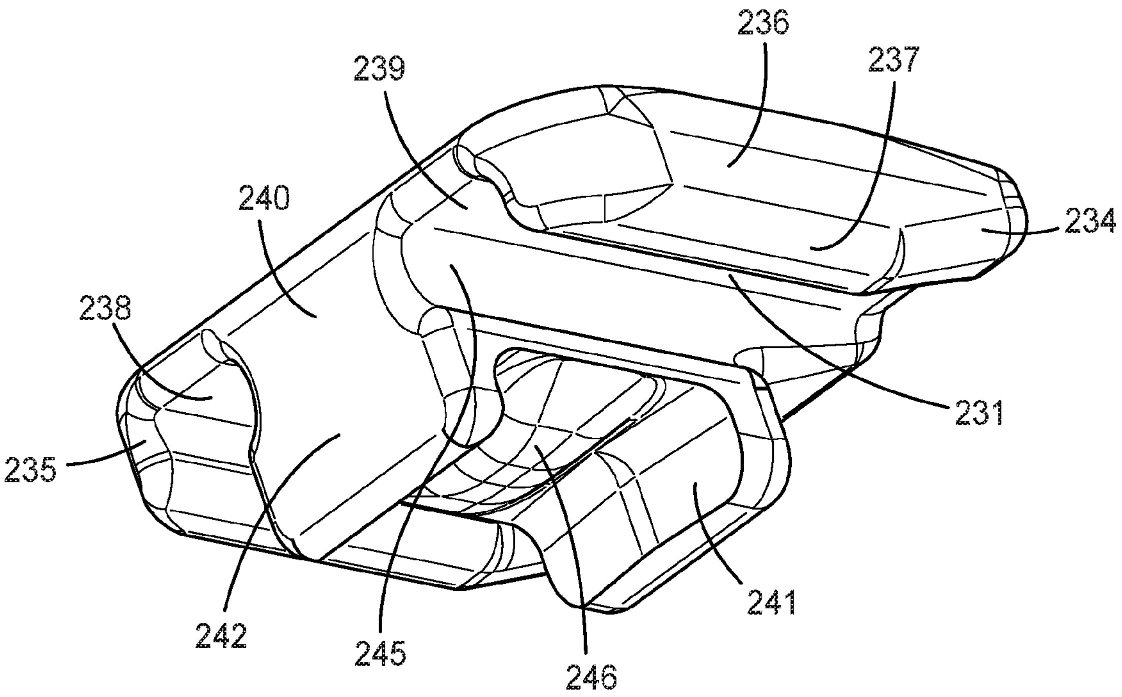
FIG. 15 is a perspective view of the door the appliance of FIGS. 11-13, looking toward its gingival, lingual, and mesial sides.

The door 230 further includes a strut 240 and a pair of grooves 238, 239 extending in an occlusal gingival direction on at least a portion of the lingual surface 231. As best depicted in FIGS. 13, the pair of grooves 238, 239 is formed into the lingual surface 231 of the door, with each groove disposed between a fin 235, 236 and the strut 240. The groove 238 corresponds in dimension and relative location to the distal door support section 215, while the groove 239 corresponds in dimension and relative location to the portion of the mesial door support section 216 disposed between the guiderail 219 and the secondary channel 250. The grooves 238, 239 share a substantially similar if not identical mesial-distal width, giving the door 230 a symmetrical appearance. As described above, the grooves 238, 239 slide along the door support sections 215, 216, and are accordingly open-ended to assist in ease of assembly.

It is to be understood that many other aspects of appliance 200 may have similar form and function to those described in appliance 100 and these need not be repeated.

The appliance doors embodied above preferably have force characteristics that enable the treating professional to easily open and close the door using a common orthodontic hand instrument, such as an orthodontic explorer. Optionally, a specialized hand instrument could be used to limit the sliding motion of the door; for example, a flat probe could be inserted in the seam between the leading edge of the door and the body, and then twisted to open the door. This could help reduce the risk of accidental debonding. In presently preferred circumstances, the force required to open and close the door is sufficiently low to enable easy operation by a practitioner but also sufficiently high such that the door does not spontaneously disengage during normal patient activity that occurs during treatment, such as chewing and tooth-brushing. Preferably, the threshold amount of force applied to open the door is at least about 0.45 newtons (0.1 lbf), at least about 0.9 newtons (0.2 lbf), at least about 2.2 newtons (0.5 lbf), or at least about 4.4 newtons (1 lbf). The threshold force can be up to about 25.8 newtons (5.8 lbf), up to about 11.6 newtons (2.5 lbf), or up to about 8.9 newtons (2 lbf).

Finite Element Analysis (FEA) can be used to examine the strength of the appliance when subjected to labial pull forces, defined as the force required to pull the door labially (e.g., opposite from the bottom wall of the slot) until failure. FEA can performed on the appliance configuration using ANSYS engineering simulation software (version 19, from ANSYS in Canonsburg, PA). For example, an appliance 100 was shown to withstand labial pull forces over 10 lbf before high stress or failure occurred. The labial pull force was tested using a 0.021 inch by 0.021 inch square stainless steel wire segment.

Kits and assemblies of the appliance described are also contemplated herein. For example, one or more of the appliances described herein may be pre-coated with a suitable orthodontic adhesive and packaged in a container or a series of containers, as described for example in U.S. Pat. No. 4,978,007 (Jacobs et al.); U.S. Pat. No. 5,015,180 (Randklev); U.S. Pat. No. 5,429,229 (Chester et al.); U.S. Pat. No. 6,183,249 (Brennan, et al.), and U.S. Pat. No. 7,726,470 (Cinader et al.) As another option, any of these appliances could also be used in combination with a placement device allowing for indirect bonding to the patient, as described in U.S. Pat. No. 7,137,812 (Cleary, et al.).

As a further option, any of the above appliances may include an archwire slot that has opposing sidewalls that are tapered to enhance torque strength, as described in International Publication No. WO2013/055529 (Yick et al.).

The appliances 100 and 200 as exemplified in the drawings is a molar or buccal tube appliance that is especially adapted for use with molar teeth. However, the principles of the present disclosure may be used with other orthodontic appliances as well. For example, orthodontic brackets adapted for bonding to anterior, cuspid, bicuspid, and pre-molar teeth may also include the elements shown and described above. In such appliances the hook will typically be on the distal side and the channel (and strut) will offset toward mesial side of the bracket.

All of the patents and patent applications mentioned above are hereby expressly incorporated into the present description. The foregoing invention has been described in some detail by way of illustration and example for purposes of clarity and understanding. However, various alternatives, modifications, and equivalents may be used and the above description should not be taken as limiting in the scope of the invention which is defined by the following claims and their equivalents.

The invention claimed is:

1. An orthodontic appliance comprising:

a base having a bonding surface, a body extending outwardly from the base, the body including a mesial-distally extending archwire slot having a bottom wall and an occlusal-gingivally extending channel offset from a central axis of the body, a mesial door support section and a distal door support section formed on the body and separated by the channel, wherein the mesial door support section has a greater volume than the distal door support section;

a door slidably coupled to the body and moveable between an open state, in which an archwire is positionable within the archwire slot, and a closed state, in which the archwire is retained within the archwire slot, wherein, in the closed state, the door extends over and covers the mesial door support section and the distal door support section, and a portion of the door is positioned above a central portion of the archwire slot and above at least a portion of each of the mesial and distal door support sections, wherein the door is slidable along a direction that is oblique to the bottom wall of the archwire slot, wherein a lingual surface of the door includes at least one groove extending through at least a portion of an occlusal-gingival height of the door, and wherein, in the closed state, a portion of the groove is positioned over the archwire slot, and wherein a beam is deflectable in a direction toward a bottom of the channel to allow the door to transition between the open state and the closed state.

2. The orthodontic appliance of claim 1, wherein the door includes a strut extending from a lingual surface and dividing the lingual surface into first and second side surfaces on either side of the strut, wherein the strut is slidably received in the channel, and wherein an area of a first side surface is greater than an area of a second side surface.

3. The orthodontic appliance of claim 1, wherein the door has a lingual surface that includes coplanar mesial and distal surfaces, wherein the bottom wall forms an acute angle with the mesial and distal surfaces, and wherein the lingual surface includes a leading edge region that has planar contacting surfaces that are substantially parallel to the bottom wall.

4. The orthodontic appliance of claim 2, wherein the channel further comprises a latch oriented generally perpendicular to the channel.

5. The orthodontic appliance of claim 2, wherein the strut includes at least one channel extending along a mesial or distal side of the strut, and wherein the body includes at least one guide rail that is slidably engaged in the at least one channel of the strut.

6. The orthodontic appliance of claim 1, wherein the door opens in a generally gingival direction.

7. The orthodontic appliance of claim 1, wherein the body includes a hook protruding from a gingival region of the body.

8. The orthodontic appliance of claim 7, wherein the hook includes a distally extending portion that protrudes to an end point, with the end point residing substantially adjacent the central axis of the body.

9. The orthodontic appliance of claim 8, wherein the end point of the hook does not extend to a mesial edge of the channel.

10. The orthodontic appliance of claim 1, wherein the door includes a strut, the channel includes a latch, and wherein the latch is disposed between an occlusal leading projection of the strut and a gingival trailing projection of the strut when the orthodontic appliance is assembled.

11. The orthodontic appliance of claim 1, wherein a mesial edge of the mesial door support section is generally parallel to a distal edge of the distal door support section, and wherein a longitudinal axis of the channel is substantially parallel to the distal edge.

12. The orthodontic appliance of claim 1, wherein a mesial edge of the channel is displaced from the central axis of the body.

13. The orthodontic appliance of claim 1, wherein the mesial door support section includes a first maximum width and the distal door support section includes a second maximum width, and wherein the first maximum width is at least 1.25 times greater than the second maximum width.

14. The orthodontic appliance of claim 13, wherein the first maximum width is at least 1.75 times greater than the second maximum width.

15. The orthodontic appliance of claim 14, wherein the mesial door support section includes a mesial edge and a distal edge adjacent the channel, and wherein the maximum width is measured between the mesial edge and the distal edge.

16. The orthodontic appliance of claim 1, wherein the door includes a strut, wherein a lingual surface of the door includes a mesial groove and a distal groove on opposing sides of the strut, and wherein a mesial-distal width of the mesial groove is at least 1.25 times greater than a mesial-distal width of the distal groove.

17. An orthodontic appliance comprising:

a base having a bonding surface;

a body extending outwardly from the base, the body including a mesial-distally extending archwire slot and an occlusal-gingivally extending channel offset from a central axis of the body; and a door slidably coupled to the body and movable between an open state and a closed state, wherein the door includes a strut having an occlusal leading projection, a gingival trailing projection, and a protrusion disposed between the occlusal leading projection and the gingival trailing projection, and wherein the strut is slidably received in the channel;

wherein, in the closed state, the door extends over and covers a plurality of door support sections formed on the body, and a portion of the door is positioned above a central portion of the archwire slot and above at least a portion of the plurality of door support sections, and wherein the door is slidable along a direction that is oblique to a bottom wall of the archwire slot, and wherein a beam is deflectable in a direction toward a bottom of the channel to allow the door to transition between the open state and the closed state.

18. An orthodontic appliance comprising:

a base having a bonding surface;

a body extending outwardly from the base, the body including a mesial-distally extending archwire slot and an occlusal-gingivally extending channel offset from a central axis of the body; and a door slidably coupled to the body and movable between an open state and a closed state, wherein a lingual surface of the door includes at least one groove extending along at least a portion of an occlusal-gingival height of the door, and wherein, in the closed state, a portion of the groove is positioned over the archwire slot;

wherein, in the closed state, the door extends over and covers a plurality of door support sections formed on the body, and a portion of the door is positioned above a central portion of the archwire slot and above at least a portion of the plurality of door support sections, and wherein the door is slidable along a direction that is oblique to a bottom wall of the archwire slot, and wherein a beam is deflectable in a direction toward a bottom of the channel to allow the door to transition between the open state and the closed state.

19. The orthodontic appliance of claim 18, wherein the door is slidable along the channel that extends in an occlusal-gingival direction, and wherein the bottom wall extends in a mesial-distal direction.

20. The orthodontic appliance of claim 18, wherein the channel further comprises a latch oriented generally perpendicular to the channel.

* * * * *